Oct. 31, 1967  W. D. BEHLEN  3,349,794
HYDRAULICALLY POWERED SELF-PROPELLED CONTINUOUSLY
FED IRRIGATION DEVICE
Filed Dec. 23, 1965  3 Sheets-Sheet 1
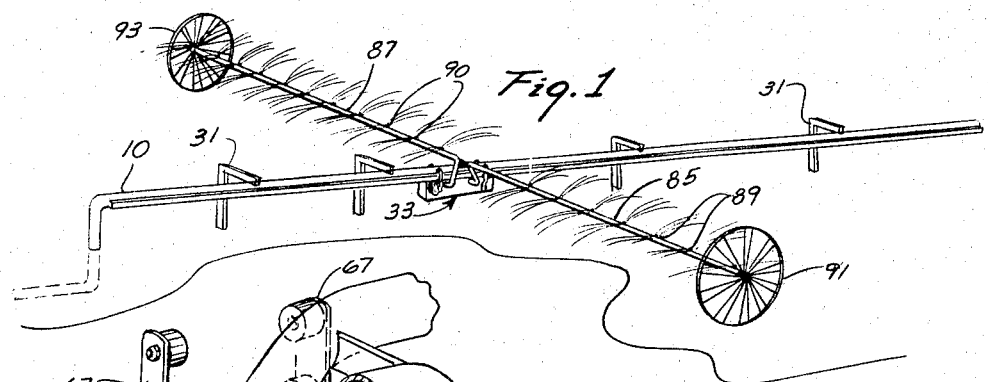
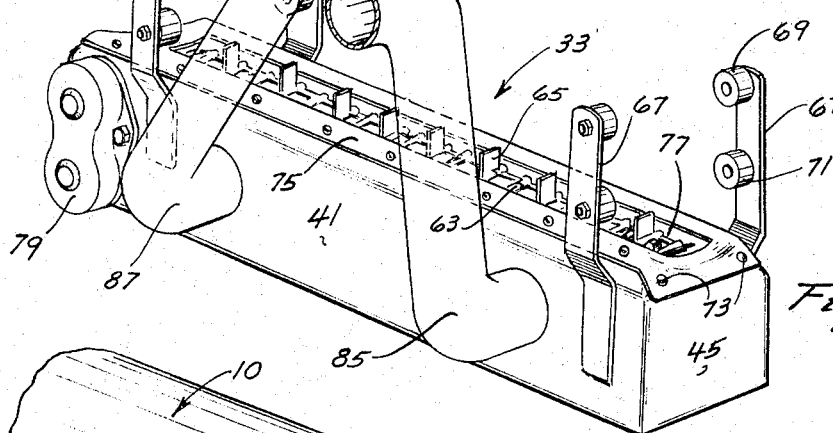
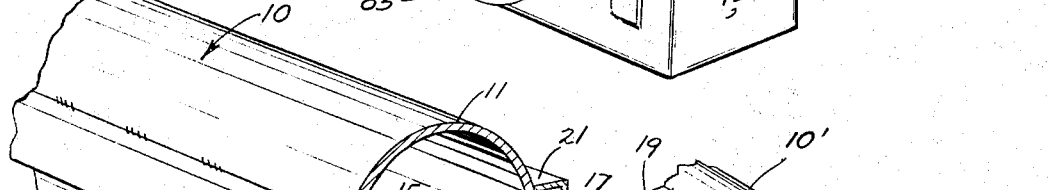
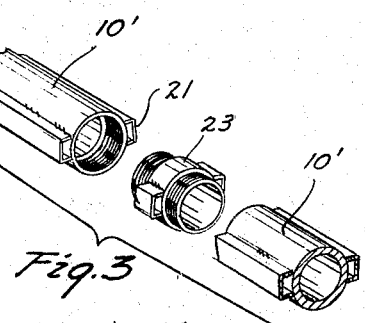
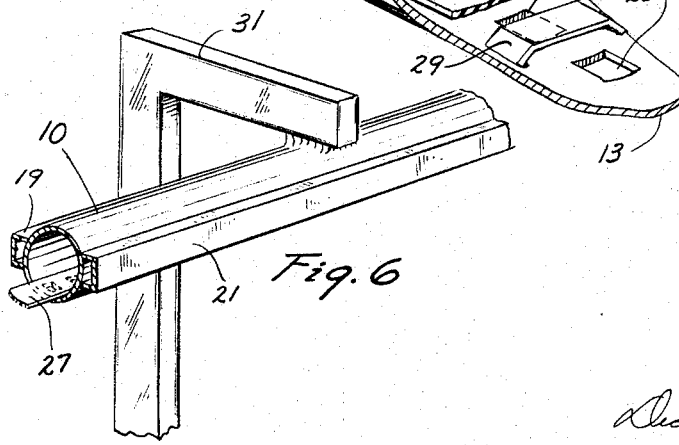
INVENTOR.
WALTER D. BEHLEN
BY

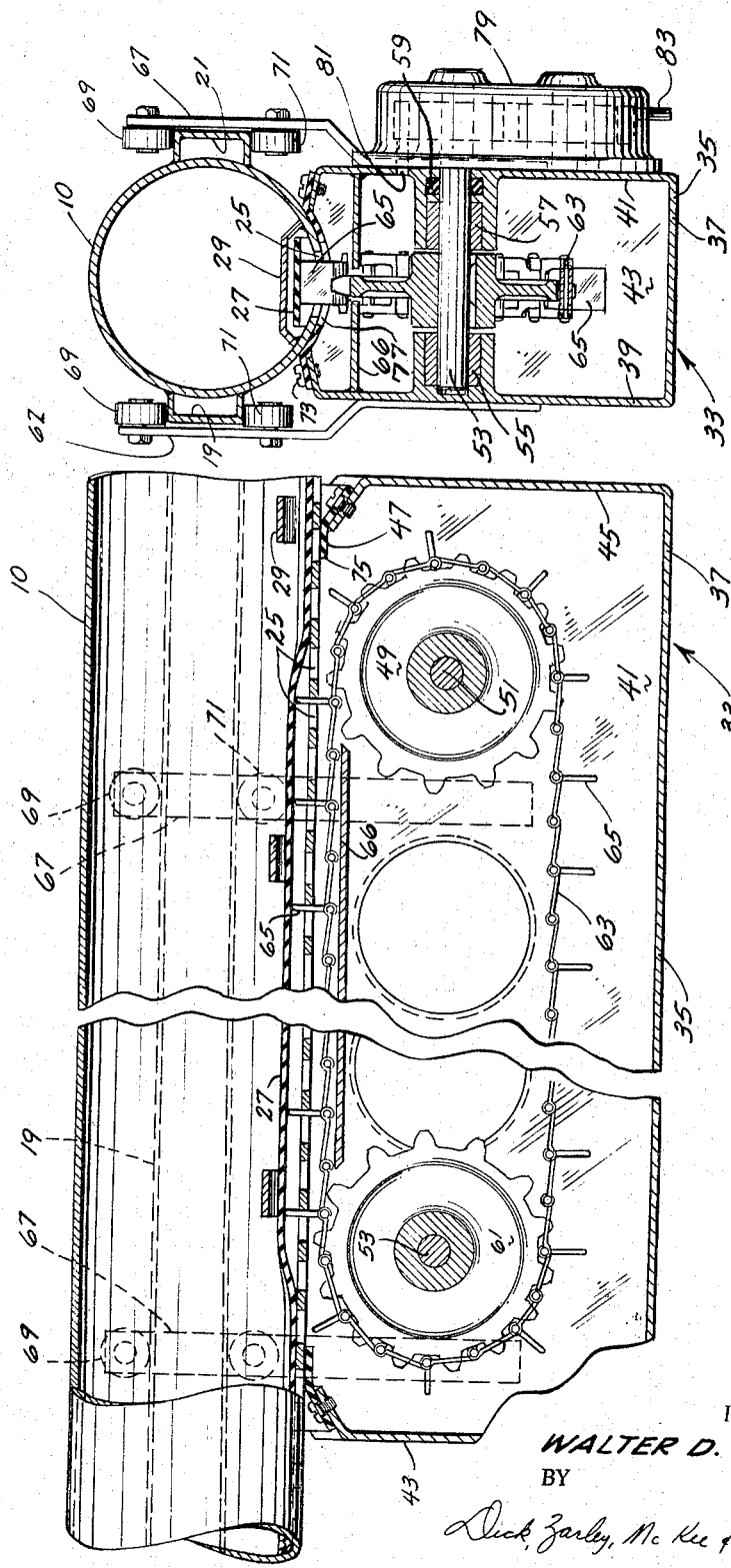

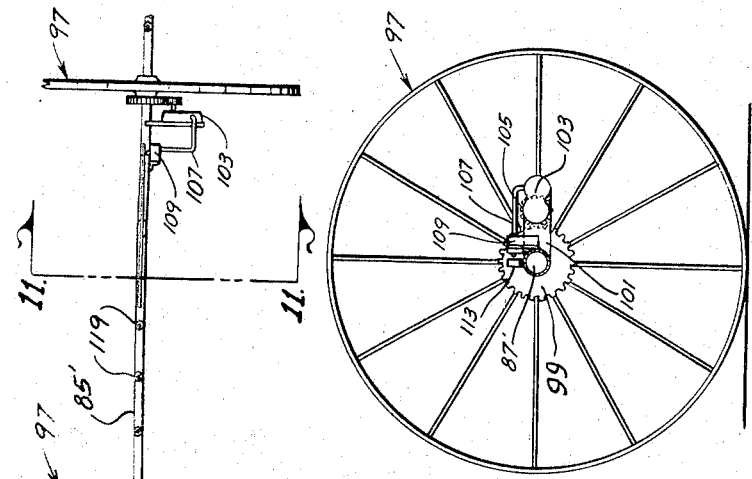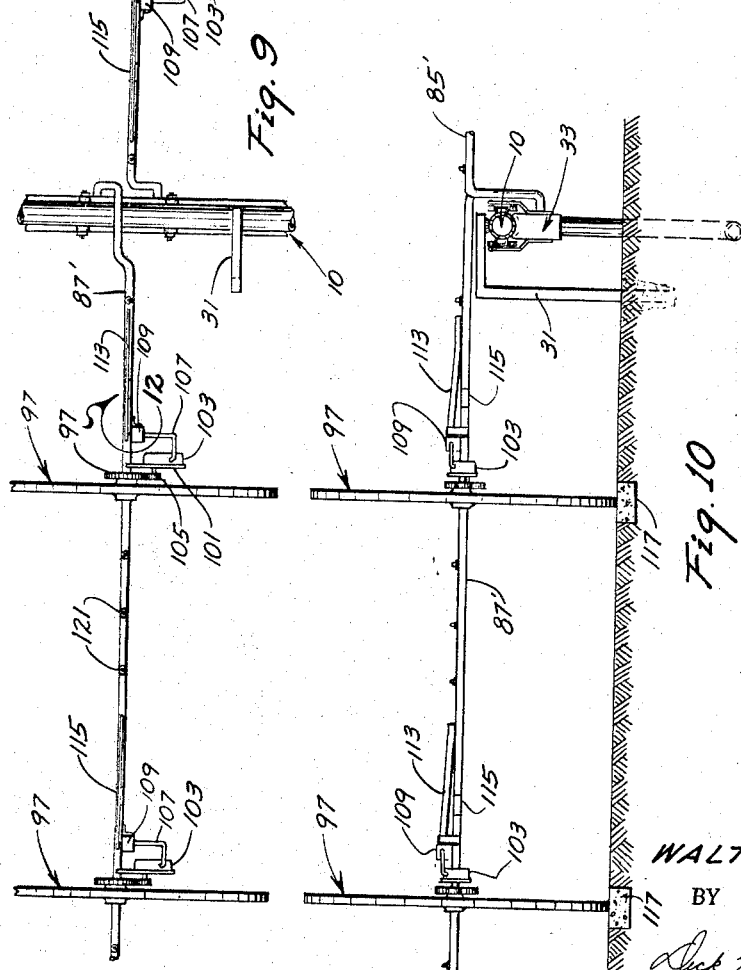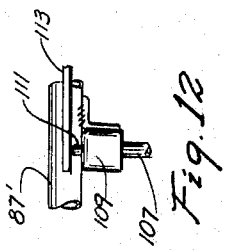

United States Patent Office 3,349,794
Patented Oct. 31, 1967

3,349,794
HYDRAULICALLY POWERED SELF-PROPELLED
CONTINUOUSLY FED IRRIGATION DEVICE
Walter D. Behlen, Columbus, Nebr., assignor to Behlen
Manufacturing Company, Inc., Columbus, Nebr., a corporation of Nebraska
Filed Dec. 23, 1965, Ser. No. 515,814
10 Claims. (Cl. 137—344)

This invention relates to an irrigation device and more particularly to a self-propelled irrigation device.

The irrigation systems of the sprinkling type presently available are unsatisfactory for several reasons. The two main reasons that the present irrigation systems are unsatisfactory are: (1) The heretofore irrigation systems do not adequately irrigate large fields; and (2) The heretofore irrigation systems must be constantly manually moved from one field area to another field area to irrigate the field.

Therefore, it is a principal object of this invention to provide a self-propelled irrigation device.

A further object of this invention is to provide a self-propelled irrigation device including a main stationary pipeline and a laterally moving pipeline in operative communication therewith.

A further object of this invention is to provide a self-propelled irrigation device including means on the laterally moving pipeline to prevent lateral deflection of said laterally moving pipeline.

A further object of this invention is to provide a self-propelled irrigation device having a valve means movably mounted on a main stationary pipeline.

A further object of this invention is to provide a method of irrigating large fields without manually moving the irrigation system.

A further object of this invention is to provide a self-propelled irrigation device which uniformly irrigates a field.

A further object of this invention is to provide a self-propelled irrigation device which is economical of manufacture, durable in used and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the device as it is used in the field;

FIG. 2 is a perspective view of the water chamber which moves along the stationary pipeline;

FIG. 3 is a partial exploded perspective view illustrating how the stationary pipeline sections are secured together;

FIG. 4 is a partial perspective view of the stationary pipeline with portions thereof cutaway to more fully illustrate the invention;

FIG. 5 is a partial side elevational view of the pipe sections of FIG. 3 in an assembled condition;

FIG. 6 is a partial perspective view illustrating the means for supporting the stationary pipeline;

FIG. 7 is a longitudinal sectional view through the stationary pipeline and the movable water chamber;

FIG. 8 is a sectional view taken at right angles through FIG. 7;

FIG. 9 is a partial plan view of a modified version of the device;

FIG. 10 is a partial side view of the modification of FIG. 9;

FIG. 11 is a sectional view as seen on lines 11—11 of FIG. 10, at an enlarged scale, and FIG. 12 is a fragmentary top plan view of the valve arrangement on the modified version of FIG. 9.

With respect to FIGS. 1–8, the numeral 10 generally designates a horizontal stationary pipe spaced above the surface to be irrigated which includes an upper portion 11, bottom portion 13, and opposite side portions 15 and 17. A pair of channel members 19 and 21 are secured to pipe 10 at opposite sides thereof (FIG. 4) by means of welding or the like and as will be described later serve as bearing surfaces. Pipe 10 is comprised of a plurality of pipe sections 10' having internally threaded ends (FIGS. 3 and 5) which are connected together by means of pipe couplings 23. Pipe sections 10' could be welded together rather than utilizing pipe couplings if desired.

Pipe 10 is also provided with a plurality of spaced apart openings 25 formed in its bottom portion along the length thereof. An elongated flat belt valve 27 is positioned over openings 25 and is comprised of flexible rubber or the like. A plurality of retainers 29 (FIG. 4) are welded to the interior surface of pipe 10 and are designed to limit the lateral and vertical movement of valve 27. Pipe 10 is in communication with a source of water under pressure and is supported above the ground by means of L-shaped supports 31 to which pipe 10 is welded.

The numeral 33 generally designates a valve means movably mounted on pipe 10 as illustrated in FIGS. 1, 7 and 8. Valve means 33 includes an elongated hollow water chamber 35 having a bottom 37, side walls 39 and 41, end walls 43 and 45 and an open upper end 47. A sprocket 49 is rotatably mounted on a shaft 51 which is operatively rotatably mounted on and extends between side walls 39 and 41 adjacent end wall 45. A shaft 53 is rotatably mounted in water chamber 35 adjacent end wall 43 and has one end thereof rotatably received by a bearing means 55 on sidewall 39. The other end of shaft 53 is rotatably received by a bearing means 57 on side wall 41 and extends outwardly therethrough. A seal 59 of the O-ring type embraces shaft 53 (FIG. 8) adjacent side wall 41. As seen in FIGS. 7 and 8, a sprocket 61 is mounted on shaft 53 for rotation therewith. A chain 63 extends around and between sprockets 49 and 61 and is comprised of a plurality of chain links. As best seen in FIG. 7, chain 63 is provided with a plurality of spaced apart finger members 65 extending therefrom which are adapted to be received by openings 25 in pipe 10. The interior of water chamber 35 is also provided with a chain guide 66 upon which chain 63 moves as best illustrated in FIGS. 7 and 8.

Water chamber 35 is movably mounted on pipe 10 by means of a plurality of brackets 67 secured to side walls 39 and 41 by welding or the like and which extend upwardly therefrom. The upper ends of each of the brackets 67 provided with upper and lower bearings 69 and 71 respectively are rotatably secured thereto. Upper bearing 69 is adapted to engage the upper surface of the channels 19 or 21 while bearing 71 is adapted to engage the lower surface of the channels 19 or 21 (FIG. 8).

Secured to the upper end of water chamber 35 by screws 73 is a flexible seal 75 comprised of rubber or the like and having a central opening 77 formed therein. Seal 75 is adapted to engage the bottom portion of pipe and as best illustrated in FIG. 8.

A conventional reversible hydraulic motor 79 is mounted on the exterior surface of side wall 41 and is operatively connected to the outwardly extending end of shaft 53 as best seen in FIG. 8. As also best seen in FIG. 8, an inlet port 81 extends through side wall 41 and into hydraulic motor 79 to permit communication between the interior of water chamber 35 and the interior of hydraulic motor 79. Hydraulic motor 79 is also provided with a discharge port 83 formed therein at the lower end thereof.

As seen in FIGS. 1 and 2, a pair of lateral pipes 85 and 87 are secured to and extend outwardly from side wall 41 and are in communication with the interior of water chamber 35. Pipe 87 extends over the top of pipe 10 as best seen in FIG. 1. Pipes 85 and 87 are provided with a plurality of water sprinkling heads 89 and 90 mounted thereon respectively and are supported above the ground by a plurality of wheels 91 and 93 rotatably mounted thereon respectively. Pipe 10 and pipes 85 and 87 may be of any length but the system functions extremely well when the field to be irrigated is rectangular in shape. When the field is so shaped, pipe 10 would be constructed at the center of the field along the length thereof while pipes 85 and 87 would extend to opposite sides of the field.

The normal method of operation of the embodiment of FIGS. 1–8 is as follows: Valve 33 would initially be positioned at one end of pipe 10 and water under pressure would be supplied to the interior of pipe 10. As described before, seal 27 normally engages the interior bottom surface of pipe 10 and prevents water from escaping from pipe 10 through openings 25. However, finger members 65 extend upwardly through openings 25 in pipe 10 and push seal 27 upwardly to the position seen in FIG. 7 and FIG. 8. The upward movement of seal 27 permits the water in pipe 10 to escape therefrom through openings 25 and into the interior of water chamber 35. Seal 75 on water chamber 35 prevents the water from escaping from the upper end of water chamber 35 and central opening 77 in seal 75 permits the downwardly moving water to enter water chamber 35. The water will pass outwardly from water chamber 35 through pipes 85 and 87. Pipes 85 and 87 would irrigate the field by means of the sprinkling heads provided thereon.

The water pressure in water chamber 35 causes water to be circulated through the interior of hydraulic motor 79 by means of inlet port 81 and discharge port 83. The circulation of water within motor 79 causes shaft 53 to be rotated. The rotation of shaft 53 causes sprockets 61 and 49 and chain 63 to be rotated. The rotation of chain 63 causes finger members 65 thereon to successively engage openings 25 to propel valve means 33 and pipes 85 and 87 slowly along the length of pipe 10. It can be seen that finger members 65 serve a dual purpose, that is, (1) to disengage seal 27, and (2) to act as cogs to propel valve 33 along the length of pipe 10. Once the system has been activated it may be left unattended until the valve means 33 reaches the other end of pipe 10. When the valve means 33 and pipes 85 and 87 reach the other end of pipe 10, the direction of movement of valve means 33 and pipes 85 and 87 may be reversed by simply switching hydraulic motor 79 into reverse whereupon chain 63 will be rotated in a direction opposite to that previously which will cause valve means 33 and pipes 85 and 87 to be moved toward the other end of pipe 10.

With respect to the embodiments of FIGS. 9, 10 and 11, only pipes 85 and 87 and the structure associated therewith has been modified with the remaining structure of the system being identical to FIGS. 1–8 and for that reason will be referred to by the reference numerals previously assigned thereto.

As seen in FIGS. 9–11, pipes 85' and 87' extend laterally from valve means 33 and are provided with a plurality of wheel means 97 rotatably mounted thereon along the length thereof. Inasmuch as each of the wheel means 97 are identical, only one wheel means will be described. A toothed gear 99 is secured to wheel means 97 at the center thereof as best seen in FIG. 11. A bracket 101 is welded to pipe 87' and extends horizontally therefrom and has a hydraulic motor 103 mounted thereon. Hydraulic motor 103 is provided with a gear 105 which is in engagement with gear 99. A conduit 107 extends from hydraulic motor 103 to a valve 109 on pipe 87'. Valve 109 is in communication with the interior of pipe 87 and is regulated by a plunger 111 extending therefrom. A bar 113 is secured to pipe 87' by welding or the like and terminates adjacent plunger 111. Pipe 87' is provided with a plurality of flexible couplings 115 to permit the pipe to be deflected without damaging the pipe.

If desired, concrete ribbons 117 may be provided upon which wheel means 97 may travel. Ordinarily, the pipes 85' and 87' will be in a transverse relationship to pipe 10 as illustrated in FIG. 9. In operation, the water in either of pipes 85' and 87' will supply water to the valves 109 mounted thereon respectively. Valves 109 supply water to the hydraulic motors 103 by means of conduits 107. Hydraulic motors 103 cause the rotation of wheel means 97 by means of the engagement of gears 99 and 105. In ideal terrain, the driving of the various wheels on pipes 85' and 87' by hydraulic motors 103 will maintain the transverse relationship between pipes 85' and 87' with pipe 10. However, when various of the wheels just described engages an obstruction, an incline or the like, pipes 85' and/or 87' will tend to be deflected rearwardly or in other words tend to lag behind the moving valve means 33. When such rearward deflection occurs, plunger 111 moves out of engagement with bar 113. The disengagement of plunger 111 with bar 113 "opens up" valve 109 which causes an additional amount of water to be supplied to hydraulic motor 103 by means of valve 109 and conduit 107. The additional amount of water being supplied to hydraulic motor 103 causes the rate of rotation of gear 105 to be increased which also causes the rate of rotation of gear 99 to be increased. The increased rate of rotation of gear 99 on the wheel means causes the pipe 87' to be moved forwardly at a greater speed than the forward movement of valve means 33 which causes pipe 87' to be moved forwardly to once again assume the transverse relationship with respect to pipe 10. When pipe 87' has been brought back into a transverse relationship with pipe 10, plunger 111 once again engages bar 113 which causes valve 109 to reduce the amount of water being supplied to hydraulic motor 103 to prevent the pipe 87' from moving forwardly of valve means 33. Thus it can be seen that the valve 109 and its associated structure at each of the wheel means 97 compensates for any lateral deflection of the pipe and maintains the pipe in a transverse relationship with respect to pipe 10. All of the wheel means 97 on pipes 85' and 87' function in identical fashion and serve to propel, support and re-align pipes 85' and 87'. The pipes 85' and 87' are provided with a plurality of sprinkling heads 119 and 121 respectively to uniformly irrigate the field.

It can be seen from the foregoing that a unique means has been described herein for uniformly irrigating a field without the necessity of manually moving the various irrigation pipes from one area to another area of the field. It can also be appreciated that a simple but yet extremely efficient means has been provided for propelling a pair of laterally travelling sprinkling pipes along the length of a main stationary pipe. Additionally, it can be appreciated that the unique means has been described herein for maintaining the laterally travelling sprinkling pipes in a transverse relationship to the main stationary pipe at all times.

Pipes 10, 85, 87, 85' and 87' should be constructed of a suitable metal material such as steel or aluminum. Preferably, water chamber 35 should also be constructed of a suitable metal material such as steel, aluminum or the like.

Thus it can be seen that at least all of the stated objectives have been accomplished.

Some changes may be made in the construction and arrangement of my irrigation device without departing from the real spirit and purpose of my invention, and it is my intention to cover by my claims, any modified forms of structure or use of mechanical equivalents which may be reasonably included within their scope.

I claim:
1. In an irrigation means,
a stationary pipe spaced above the surface to be irrigated and having a bottom portion and opposite sides,
said stationary pipe being in communication with a source of water under pressure,
said stationary pipe having a plurality of spaced apart openings formed in its bottom portion along the length thereof,
an elongated valve means in said stationary pipe normally positioned over said openings in said stationary pipe,
a valve means movably mounted on said stationary pipe adapted to move along the length thereof,
a first means in said valve means adapted to disengage a portion of said elongated valve means from said openings in said stationary pipe to permit communication between the interior of said stationary pipe and said valve means,
at least one lateral pipe extending from said valve means and being in communication therewith,
said first means adapted to successively engage said openings in said stationary pipe to cause said valve means to be moved along the length of said stationary pipe,
and a hydraulic power means on said valve means in operative communication therewith and being operatively connected to said first means to cause said first means to successively engage said openings in said stationary pipe to cause said valve means to be moved along the length of said stationary pipe,
said lateral pipe being adapted to discharge water on the surface to be irrigated.

2. The means of claim 1 wherein first and second bearing surfaces are secured to opposite sides of said stationary pipe and said valve means is operatively suspended therefrom.

3. The means of claim 1 wherein a retaining means is positioned over said elongated valve means in said stationary pipe to limit lateral and vertical movement of said elongated valve means.

4. The means of claim 1 wherein said valve means includes a hollow water chamber having opposite ends, opposite sides and an open upper end and wherein said first means includes first and second spaced apart sprocket members rotatably mounted in said water chamber, a chain means extending around and between said first and second spaced apart sprockets, said chain means having a plurality of spaced apart finger members secured thereto and extending therefrom through some of said openings in said stationary pipe, one of said first and second sprocket members being operatively connected to said hydraulic power means to cause rotation of said chain means.

5. The means of claim 2 wherein said first and second bearing surfaces each include upper and lower surfaces, a plurality of brackets secured to and extending upwardly from said valve means, each of said brackets having upper and lower bearings rotatably secured thereto which are adapted to rotatably engage the upper and lower surfaces respectively of one of said first and second bearing surfaces.

6. The means of claim 1 wherein said lateral pipe has at least one wheel means rotatably mounted thereon, a gear means on said wheel means, a second hydraulic power means operatively secured to said lateral pipe and having a power driven gear in engagement with said gear means on said wheel means, a second valve means on said lateral pipe in communication with said second hydraulic power means and in communication with said lateral pipe and having a plunger extending therefrom adapted to control the flow of water from said lateral pipe to said second hydraulic power means, a rigid bar means on said lateral pipe adapted to engage said plunger at times to cause said second valve means to vary the flow of water to said second hydraulic power means to control the rate of rotation of said wheel means.

7. The means of claim 6 wherein said second valve means supplies a greater volume of water to said second hydraulic power means when said plunger is free from engagement with said bar means than when said plunger is in engagement with said bar means.

8. The means of claim 1 wherein at least one wheel means is rotatably mounted on said lateral pipe.

9. The means of claim 8 wherein a ribbon of concrete is provided on the surface to be irrigated upon which said wheel means travels.

10. The means of claim 4 wherein a seal means is secured to said water chamber at the upper end thereof between said water chamber and said stationary pipe, said seal means having a central opening formed therein to permit communication between said stationary pipe and said water chamber.

References Cited
UNITED STATES PATENTS

| | | |
|---|---|---|
| 1,008,004 | 11/1911 | Bacigalupi _____ 239—183 X |
| 2,798,506 | 7/1957 | Baker et al. _____ 137—580 |
| 3,012,574 | 12/1961 | Baker et al. _____ 137—580 |
| 3,217,725 | 11/1965 | Varian _____ 137—580 X |
| 3,268,174 | 8/1966 | Boone _____ 137—344 X |
| 3,295,763 | 1/1967 | Brauner _____ 239—185 X |

M. HENSON WOOD, Jr., *Primary Examiner.*

VAN C. WILKS, *Assistant Examiner.*